(12) United States Patent
Maxwell

(10) Patent No.: US 6,444,121 B1
(45) Date of Patent: Sep. 3, 2002

(54) FUEL FILTER SYSTEM WITH WATER BLEED AND WATER TRAP

(75) Inventor: M. Craig Maxwell, Ripon, CA (US)

(73) Assignee: Stanadyne Corporation, Windsor, CT (US)

(*) Notice: Subject to any disclaimer, the term of this patent is extended or adjusted under 35 U.S.C. 154(b) by 0 days.

(21) Appl. No.: 09/463,809
(22) PCT Filed: Oct. 29, 1999
(86) PCT No.: PCT/US99/25562
§ 371 (c)(1), (2), (4) Date: Jan. 19, 2000
(87) PCT Pub. No.: WO00/27500
PCT Pub. Date: May 18, 2000

Related U.S. Application Data
(60) Provisional application No. 60/107,295, filed on Nov. 6, 1998.

(51) Int. Cl.[7] .................. B01D 35/02; B01D 17/02; B01D 17/022; B01D 36/02; F02M 39/00
(52) U.S. Cl. ............. 210/172; 210/195.1; 210/196; 210/314; 123/509; 123/510; 123/514
(58) Field of Search ............... 210/172, 314, 210/195.1, 196; 123/509, 510, 514

(56) References Cited

U.S. PATENT DOCUMENTS

| | | | | |
|---|---|---|---|---|
| 4,142,973 A | * | 3/1979 | Kachman | |
| 4,366,837 A | * | 1/1983 | Roettgen | |
| 4,758,350 A | | 7/1988 | Pitts et al. | 210/679 |
| 4,795,556 A | * | 1/1989 | Brotea et al. | |
| 4,814,087 A | * | 3/1989 | Taylor | |
| 4,861,469 A | | 8/1989 | Rossi et al. | 210/172 |
| 4,861,470 A | | 8/1989 | Casey | 210/172 |
| 4,959,141 A | * | 9/1990 | Anderson | |
| 5,130,018 A | | 7/1992 | Tolman et al. | 210/172 |
| 5,683,499 A | | 11/1997 | Kiyani | 96/147 |

FOREIGN PATENT DOCUMENTS

| | | |
|---|---|---|
| DE | 599811 | 6/1934 |
| GB | 670250 | 4/1952 |

OTHER PUBLICATIONS

EPO Search Report, dated Dec. 27, 2001.

* cited by examiner

Primary Examiner—Thomas M. Lithgow
(74) Attorney, Agent, or Firm—Alix, Yale & Ristas, LLP

(57) ABSTRACT

A fuel filter system employs a first filter (12) to separate water from the fuel and a second filter (38) which receives the water portion from the first filter (12) and removes the water from the residual fuel with the use of hygroscopic material (42) and recycles the residual fuel back to the fuel tank (16).

13 Claims, 1 Drawing Sheet

FUEL FILTER SYSTEM WITH WATER BLEED AND WATER TRAP

This application claims priority from provisional application No. 60/107,295, filed Nov. 6, 1998.

BACKGROUND OF THE INVENTION

This invention relates generally to fuel filter systems employed in connection with internal combustion engines. More particularly, the present invention relates to fuel filter systems for removing foreign particles and separating water from the fuel supply or oil system of an internal combustion engine.

The absence of high standards of quality control in diesel fuel supplies dictates that an effective fuel filter be incorporated into the fuel supply system for a diesel engine. It is not uncommon for diesel fuel to have significant quantities of abrasive particles and water. The abrasive particles present the potential for permanent damage to components of the fuel injection pump. The abrasive particles can also adversely effect the performance of the pump by destroying the ability of the fuel injection pump to precisely meter and deliver fuel at high pressures. The presence of water in the diesel fuel supply can cause rusting of engine components, and during freezing conditions, can result in interruption of the fuel injection system and/or seizure of moving components.

A number of conventional fuel filters perform the dual function of removing particulate material from the diesel fuel and separating water from the fuel. Commonly, such fuel filters employ a disposable filter cartridge which is replaced at pre-established intervals of filter usage. Typically, a disposable filter/water separator cartridge is releasably secured to a base. A multi-stage filter assembly within the cartridge includes filtering and coalescing media and separates an upper portion of the chamber from a lower portion which functions as a water collection sump. The fuel filter may also feature a sensing device in the base to indicate the presence of a predetermined quantity of water in the sump. A petcock allows the water to be removed from the sump.

SUMMARY OF THE INVENTION

Briefly stated, the invention in a preferred form is a fuel filter system for removing foreign particles and separating water from the fuel supply of an internal combustion engine. The fuel filter system includes a first filter having a filter element that separates water from the fuel. The water collects in a sump in the lower portion of the first filter and exits the sump via an outlet. A second filter includes an enclosure having an inlet in fluid communication with the outlet of the first filter and an outlet in fluid communication with the fuel tank. A filter element composed of a hygroscopic material is contained in the enclosure. The water is absorbed by the hygroscopic material and any fuel that is entrained in the water is returned to the fuel tank via a return line.

The volume of the hygroscopic material increases as it absorbs water, restricting flow through the second filter and increasing the pressure inside the second filter and the waste line connecting the first and second filters. A pressure sensor monitors the pressure inside the second filter and sends a signal when the pressure reaches a predetermined level, indicating that the second filter must be changed. A pressure relief valve in the waste line has a setpoint below the first filter nominal pressure and above the signal pressure, thereby ensuring that there is no back flow from the second filter.

An object of the invention is to provide a new and improved fuel filter system.

Another object of the invention is to provide a new and improved fuel filter system having apparatus that facilitates disposal of water that is separated from the fuel.

A further object of the invention is to provide a new and improved fuel filter system having apparatus that reduces the cost of disposing water that is separated from the fuel.

Other objects and advantages of the invention will become apparent from the drawings and specification.

BRIEF DESCRIPTION OF THE DRAWING

The present invention may be better understood and its numerous objects and advantages will become apparent to those skilled in the art by reference to the accompanying drawing which is a schematic diagram of a fuel filter system in accordance with the invention showing the fuel filter and clean-up filter with a portion of the enclosures removed.

DETAILED DESCRIPTION OF THE PREFERRED EMBODIMENT

Figure 1:
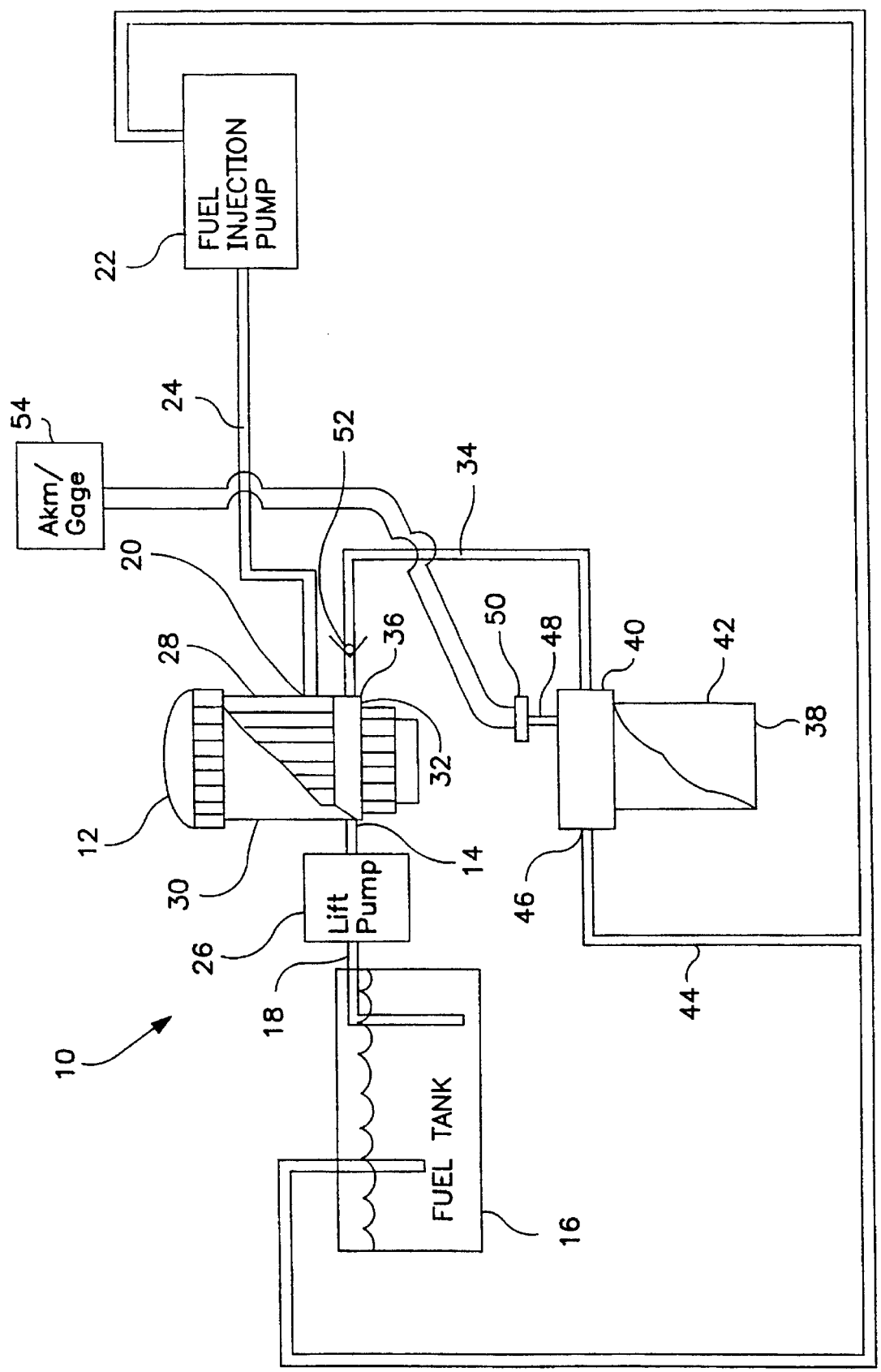

With reference to the drawing, a fuel filter system in accordance with the present invention is generally designated by the numeral 10. Fuel filter system 10 comprises a fuel filter 12 having a fuel inlet 14 in fluid communication with the fuel tank 16 via a first fuel line 18 and a fuel outlet 20 in fluid communication with the fuel injection pump 22 via a second fuel line 24. A fuel lift pump 26 may be disposed in the first fuel line 18, intermediate the fuel tank 16 and the fuel filter 12, to ensure that there is an adequate flow of fuel to the fuel filter 12.

The fuel filter 12 is especially adapted for incorporation into the fuel supply system of an internal combustion engine (not illustrated), such as a diesel engine. The fuel filter 12 employs a filter element 28, such as a dual stage filter element or a single stage element, for removing particulate matter from the fuel and separating the water from the fuel. Filters of this type may also be used to filter impurities from oil in the lubricating system of an internal combustion engine. The filter element 28 is housed in an enclosure 30 having a sump 32 in its lower section to collect water which coalesces from the fuel. A waste line 34 in fluid communication with the sump 32 via a waste outlet 36 in the enclosure 30 provides a path means for draining the water from the fuel filter 12.

A constant bleed clean-up filter 38 is in fluid communication with the waste line 34 via an inlet 40. The clean-up filter 38 is provided to separate the fuel component from the water component of the water/fuel mixture that exits the fuel filter 12 via the waste line. The clean-up filter 38 contains a hygroscopic water-absorbing filter media 42, such as corn starch, fiberglass/cellulose, or similar material known in the art, that removes the water from the water/fuel mixture. The fuel is returned to the fuel tank 16 via a return line 44 connected to the outlet 46 of the clean-up filter 38. The filter media 42 dimensionally expands as it absorbs the water, restricting the flow of fluid within the clean-up filter 38 and raising the pressure of the water/fuel mixture. A pressure detector 48 senses the pressure inside the clean-up filter 38, and a pressure switch 50 sends a signal proportional to the clean-up filter pressure to an alarm/gage 54. When the clean-up filter pressure reaches a predetermined level, the alarm/gage provides an indication that the clean-up filter 38 must be changed. A pressure relief valve 52 in the waste line 34 has a setpoint below the fuel filter nominal pressure and above the pressure that actuates the clean-up indication, preventing back-flow into the fuel filter 12 due to high pressure in the clean-up filter 38.

Circulating the water/fuel mixture through the clean-up filter 38 allows the majority of the fuel in the mixture to be recovered and recirculated to the fuel tank 16. Only a small amount of fuel is contained within the clean-up filter 38 when it is removed. Consequently, a fuel filter system 10 in accordance with the present invention reduces the amount of fuel that is removed from the fuel supply system when the water is removed from the fuel supply system. Such operation provides for more efficient use of the fuel and reduces disposal costs for the material that is removed from the fuel supply system.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter system for a fuel system having a fuel tank for storing fuel, the filter system comprising:

a first filter comprising an inlet in fluid communication with the fuel tank, first filter means for separating water from the fuel, sump means for collecting the water, and an outlet in fluid communication with the sump means; and a second filter comprising an enclosure, an inlet in fluid communication with the outlet of the first filter, second filter means comprising a hygroscopic material for absorbing the water, pressure sensing means for sensing the internal pressure within the enclosure, and an outlet in fluid communication with the fuel tank.

2. The filter system of claim 1 wherein the pressure sensing means comprises signal means for transmitting a signal proportional to the pressure within the enclosure of the second filter.

3. The filter system of claim 1 wherein the hygroscopic material has a volume, wherein the volume of the hygroscopic material increases as the hygroscopic material absorbs water.

4. The filter system of claim 1 further comprising passage means for providing fluid communication between the outlet of the first filter and the inlet of the second filter and pressure relief means disposed in the passage means.

5. The filter system of claim 1 wherein the hygroscopic material comprises corn starch.

6. A filter system for a liquid delivery system for an internal combustion engine, the liquid delivery system having a storage tank containing a mixture of a first liquid and a second liquid, the filter system comprising:

a first filter comprising an inlet in fluid communication with the storage tank, first filter means for separating the first liquid from the second liquid, sump means for collecting the first liquid, a first outlet for delivering the second liquid, and a second outlet in fluid communication with the sump means; and a second filter comprising an enclosure, an inlet in fluid communication with the second outlet of the first filter, second filter means comprising an absorptive material for absorbing the first liquid, pressure sensing means for sensing the internal pressure within the enclosure, and an outlet in fluid communication with the fuel tank.

7. The filter system of claim 6 wherein the pressure sensing means comprises signal means for transmitting a signal proportional to the pressure within the enclosure of the second filter.

8. The filter system of claim 6 wherein the absorptive material has a volume, wherein the volume of the absorptive material increases as the absorptive material absorbs the first liquid.

9. The filter system of claim 6 further comprising passage means for providing fluid communication between the outlet of the first filter and the inlet of the second filter and pressure relief means disposed in the passage means.

10. A fuel system comprising:

a fuel storage tank;

a first filter comprising an inlet in fluid communication with the fuel tank, first filter means for separating water from the fuel, sump means for collecting the water, a first outlet for delivering the fuel, and a second outlet in fluid communication with the sump means;

a second filter comprising an enclosure, an inlet in fluid communication with the outlet of the first filter, second filter means comprising a hygroscopic material for absorbing the water, pressure sensing means for sensing the internal pressure within the enclosure and for transmitting a signal proportional to the pressure within the enclosure, and an outlet in fluid communication with the fuel tank;

a fuel injection pump having an inlet in fluid communication with the first outlet of the first filter and an outlet.

11. The filter system of claim 10 wherein the hygroscopic material has a volume, wherein the volume of the hygroscopic material increases as the hygroscopic material absorbs water.

12. The filter system of claim 10 further comprising passage means for providing fluid communication between the outlet of the first filter and the inlet of the second filter and pressure relief means disposed in the passage means.

13. The filter system of claim 10 further comprising a fuel lift pump having an inlet in fluid communication with the fuel storage tank and an outlet in fluid communication with the inlet of the first filter.

* * * * *